Nov. 22, 1960  C. M. SCHUHLEIN  2,961,536
SWEEP VOLTAGE GENERATOR CIRCUIT
Filed Jan. 3, 1958
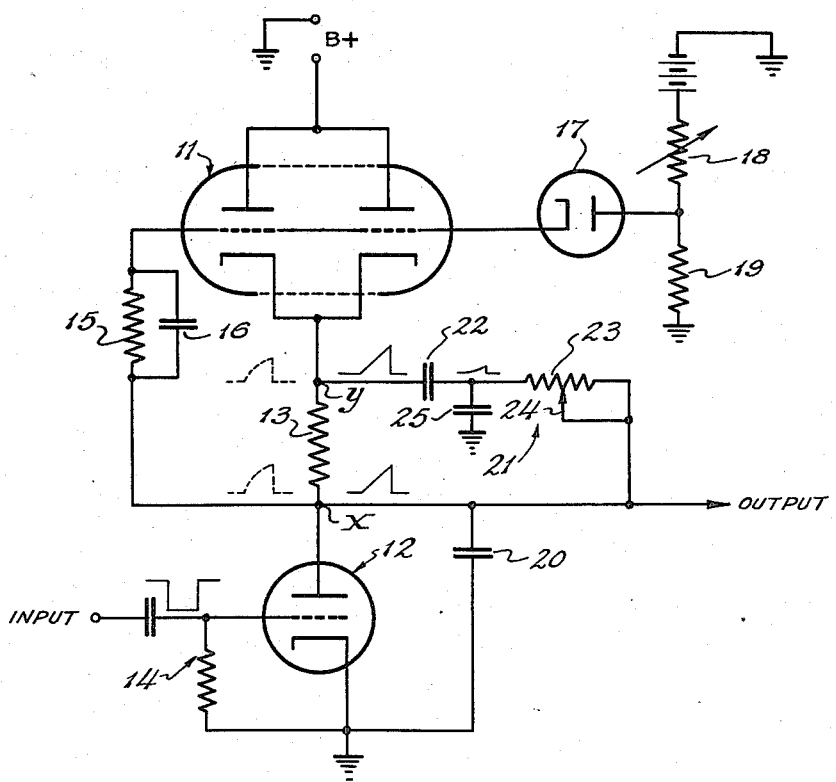
INVENTOR
CHARLES M. SCHUHLEIN
BY
ATTORNEY

United States Patent Office 2,961,536
Patented Nov. 22, 1960

2,961,536

SWEEP VOLTAGE GENERATOR CIRCUIT

Charles M. Schuhlein, Westbury, N.Y., assignor to Sperry Rand Corporation, Great Neck, N.Y., a corporation of Delaware Filed Jan. 3, 1958, Ser. No. 707,025

3 Claims. (Cl. 328—67)

The present invention relates to linear sweep voltage generator circuits. It is particularly concerned with a generator that includes a cathode follower for charging a capacitor, the cathode follower having a compensating network for improving the linearity of the sweep voltage waveform generated across the capacitor.

In a generator circuit of the above mentioned type, a capacitor is charged through a resistor from a supply voltage source. A cathode follower tube is employed for feeding a voltage waveform from the capacitor end of the resistor to the other end thereof. This tends to maintain an approximately constant voltage across the resistor and an approximately constant capacitor charging current. However, in the absence of compensation, this voltage and current will not be perfectly constant since the gain of a cathode follower is always less than unity as is known in the art. Thus, the voltage across the resistor will fall off slightly during the sweep and the voltage generated across the capacitor will have a concave downward curvature due to a decrease in charging current through the capacitor during the sweep.

It is an object of the present invention to provide a generator circuit for providing a sweep voltage waveform having a high degree of linearity.

It is a further object of this invention to provide such a generator for producing a substantially linear sweep voltage waveform which is insensitive to changes in the repetition frequency of a trigger voltage supplied to the circuit.

It is yet another object of this invention to provide a cathode follower circuit for charging a capacitor and generating a linear sweep voltage, the follower circuit utilizing an integrating network for improving the linearity of the sweep voltage waveform provided across the capacitor.

It is another object of this invention to provide a linear sweep voltage generator circuit as aforedescribed requiring only a small number of circuit elements, the circuit permitting the use of miniature tubes.

The foregoing and other objects and advantages of the present invention are attained by providing a cathode follower circuit for charging a capacitor having a switch tube connected thereacross. The switch tube is connected to the follower tube by a load resistor so that the space current paths of the tubes are in series with each other. When the switch tube is rendered inoperative after a quiescent conductive state, a voltage waveform at the end of the resistor nearest the plate of the switch tube is fed back through the follower tube to the other end of the resistor. This tends to make the voltage across the resistor approximately constant. In accordance with a principal feature of the invention, means including an integrating network are connected between the opposite ends of the resistor for feeding back a compensating voltage to the resistor for ensuring that the voltage across the resistor does remain substantially fixed. This ensures that a constant charging current for the capacitor will be maintained, thereby improving the linearity of a voltage waveform generated across the capacitor during the charging time interval. A typical use for such a circuit is found in a radar set of the type having a cathode ray tube assembly requiring a linear time base sweep voltage for the deflection means of the cathode ray tube.

Referring to the drawing,

The figure is a schematic diagram of a sweep voltage generator circuit utilizing an integrating network as a compensating circuit in accordance with the present invention.

In the figure, the plates of a double triode tube 11 are connected together and coupled directly to a source of B+ operating potential as indicated. The tube 11 is operated as a cathode follower, so preferably is of a type having a high-$\mu$ for achieving nearly unity gain. The double triode tube is employed in lieu of a single triode tube where miniature tubes are desired to be used so that a practical value of current can be maintained.

The cathodes of tube 11 are connected together and to the plate of a further triode 12 through a cathode follower load resistor 13. The tube 12 consists of one half section of a 12AT7 double triode, for example, where tube 11 is 12AX7 double triode. The space current paths of tubes 11 and 12 are in series relationship. The cathode of tube 12 is illustrated as being grounded. However, it is readily apparent that it could be connected to the negative terminal of a further source of potential having its positive terminal grounded.

The tube 12 is a switch tube for the generator circuit, and is conductive during quiescence. It has a zero value of grid bias under these conditions. An R-C coupling circuit 14 is coupled to the grid of tube 12 for applying negative rectangular gating pulses thereto, tube 12 being cut off for the duration of each gating pulse.

An R-C circuit consisting of a resistor 15 bypassed by a capacitor 16 is coupled between the grids of tube 11 and the end of resistor 13 at point X nearest the plate of tube 12. Resistor 15 should have a large value of resistance and capacitor 16 a relatively large value of capacitance. Thus, a voltage waveform produced at the plate of tube 12 during the sweep time interval will be accurately reproduced at the grid of tube 11.

The grids of the tube 11 are also connected to the cathode of a diode 17 whose plate is connected to a suitable point along a voltage divider network. This network is composed, for example, of a pair of resistors 18 and 19 connected between a positive terminal of a source of unidirectional operating potential and ground. The resistor 18 is adjustable, the voltage divider network being utilized for setting up initial quiescent conditions in the circuit.

The voltage divider network 18—19 is utilized for placing the grids of the tube 11 at a large positive potential relative to ground. This ensures that the cathode of tube 11 will be at a high potential relative to ground with a relatively large current flow through tube 11. The resistor 18 is adjusted so that during a state of quiescent current flow through tube 11, the grid potential of tube 11 is slightly less than the cathode potential of the tube.

A capacitor 20 is provided across switch tube 12 between the plate and cathode thereof. This capacitor should have a value of capacitance which is much smaller than that of capacitor 16. Capacitor 20 is charged to a fixed level during a quiescent operating state, and is adapted to be charged to a higher level during the time switch tube 12 is rendered non-conductive by a negative gating pulse supplied to tube 12. The values of resistor 13 and capacitor 20 are chosen so that the R-C time constant thereof is of the order of one and one half the width of the negative gating pulses supplied to tube 12.

An integrating network 21 and coupling capacitor 22 provides a further feedback path from the lower to the upper end of resistor 13. The network 21 is composed of a resistor 23 including an adjustable tap 24 for changing the value of resistance in the circuit. The coupling capacitor 22 should have a high value of capacitance such as that chosen for capacitor 16. Capacitor 25 should have a small value of capacitance, even smaller than that of capacitor 20. The resistor 23 should have a very large value so that the R-C constant of resistor 23 and capacitor 25 is many times that of resistor 13 and capacitor 20.

Under quiescent operating conditions with no trigger pulses being supplied to the input coupling circuit 14, tubes 11 and 12 are conducting and all the capacitors in the circuit are charged to quiescent potentials. If a negative gating pulse is supplied to the coupling circuit 14, it immediately biases tube 12 below cut off so that no current flows therein. When this occurs, the voltage at point X at the lower end of resistor 13 tends to rise exponentially, due to capacitor 20, toward the voltage of the B+ voltage source connected to the plates of the tube 11.

The voltage rise at point X is fed to the grids of tube 11 through capacitor 16. As the voltage at the grids of tube 11 goes positive, the potential at the cathode of diode tube 17 is raised above the potential at its plate, thereby cutting off diode 17. Thus, a high impedance is provided between the grids of tube 11 and the voltage divider network 18—19 so that this network is blocked out of the circuit during the sweep voltage generated across capacitor 20.

Let it be assumed for the purpose of explanation that the integrating network 21 is disconnected from the circuit. Thus, the voltage at point X will rise exponentially as indicated by the dashed line waveform thereat in the figure. Since tube 11 is connected as a cathode follower, a waveform will be produced at point Y which is almost the same as that at point X, provided the circuit 15—16 supplies a waveform to the grid of tube 11 which is substantially the same as the waveform at point X. However, since the cathode follower will not quite have unity gain, the waveform at point Y will not be exactly the same as at point X. At any given point in time, the amplitude of the waveform at point Y is slightly less than that at point X, the difference increasing with time.

The current through resistor 13 and tube 11 during the time the voltage is rising at point X is the charging current for the capacitor 20. The feedback voltage supplied from point X back through the cathode follower tends to make this current constant by keeping the voltage between points X and Y approximately the same. However, since the waveforms at points X and Y are only approximately identical, the charging current for capacitor 20 cannot be perfectly constant. Thus, the voltage across capacitor 20 is given by:

$$E_c = \frac{1}{C}\int_0^t i\, dt$$

wherein ($i$) is the charging current in amperes and initial conditions are zero, $E_c$ is the voltage across capacitor 20 in volts, C is the capacitance of capacitor 20 in farads, and $t$ is in seconds.

If the voltage waveforms at points X and Y could be kept identical during the time capacitor 20 is charged, the charging current $i$ for capacitor 20 would remain constant. Thus, the voltage across capacitor 20 would be:

$$E_c = \frac{i}{C}\int_0^t dt = \frac{(i)(t)}{C} = At$$

where $$A = \frac{i}{C} \text{ is a constant}$$

Therefore, the voltage across capacitor 20 would be $E_c = At$ (a linear rising voltage). The utilization of the compensating network 21 in accordance with the present invention ensures that the voltage across capacitor 20 will be substantially a linear rising voltage.

Consider the operation of the circuit with the R-C integrating network 21 connected therein as illustrated in the drawings. The purpose of network 21 is to produce a compensating voltage waveform in response to the voltage appearing at the point X, which is fed back to point Y. The output from network 21 will be a concave upward voltage waveform of much smaller amplitude than that at point X. This waveform from circuit 21 is added to the voltage waveform at point Y produced by the cathode follower action of tube 11. If the tap 24 along resistor 23 is properly adjusted, the resultant waveform at point Y can be made to be substantially identical with that at point X. Since this occurs, the charging current for capacitor 20 must remain substantially constant and the voltage thereacross will be a linear rising voltage.

Upon occurrence of the trailing edge of the negative gating pulse applied to the tube 12, this tube again becomes conductive. This causes capacitor 20 to be rapidly discharged through the tube 12. Capacitors 22 and 25 are also rapidly discharged. Before arrival of a succeeding negative gating pulse, any small charge which might have been stored in capacitor 16 during the generation of the sweep voltage waveform will be discharged through the resistor 15. Thus, the circuit is restored to an initial quiescent operating state before the next negative gating pulse arrives at the input circuit 14. When this pulse arrives, a further sweep voltage waveform is provided across the condenser 20 just as before.

The aforedescribed circuit is a great deal less sensitive to any changes in the repetition frequency of the input gating pulses supplied to the tube 12 than others presently used in the art. This is true since the type of compensation afforded by network 21 permits the choice of a smaller value of capacitance for capacitor 16 than similar feedback capacitors in prior art circuits, without undesirably affecting the linearity of the voltage waveform at the grids of tube 11.

If it is desired to change the length of the sweep voltage produced across capacitor 20, the width of the negative gating pulse would be changed. In order that the amplitude of the sweep will remain the same, the value of the resistor 13 would also be changed. Also, in order to ensure good compensation by network 21 so that the linear voltage will be provided across capacitor 20, the tap 24 upon resistor 23 would have to be readjusted. An increase in the duration of the negative gating pulse would require an increase in the value chosen for resistors 13 and an increase in the portion of resistor 23 included in the circuit.

In one circuit which has been successfully operated for providing a linear sweep voltage of 150 volts across capacitor 20, the following values for certain components in the circuit were chosen for a 24.4 μ sec. sweep in response to a negative gating pulse of the same duration:

$R_{13}$=10 kilohms
$C_{20}$=3900 micromicrofarads
$R_{23}$=1 megohm
$C_{25}$=1000 micromicrofarads
$C_{22}$=0.1 microfarad
$C_{16}$=0.1 microfarad
$R_{15}$=1 megohm In such a circuit, tube 11 was a 12AX7 double triode while tube 12 consisted of one half section of a 12AT7 double triode, operated with a B+ source of 405 volts. The contact 24 must be adjusted empirically for attaining the best linearity for the sweep voltage produced across capacitor 20.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A circuit for generating a linear sweep voltage waveform comprising a capacitor, a source that includes a vacuum tube having a cathode, a control grid and an anode for charging said capacitor, a load resistor connected between said cathode and said capacitor, the junction between said load resistor and said capacitor being connected to the grid of said tube for stabilizing the voltage drop across said resistor as said capacitor is charged, and an integrating network having an input and output terminal, said input terminal being connected to said junction and said output terminal being connected to said cathode.

2. The combination set forth in claim 1 including a further capacitor for connecting said output terminal of said integrating network to said cathode.

3. The combination set forth in claim 1 wherein said integrating network comprises an additional resistor connected at one end to an additional capacitor and to said cathode, the other end of said additional resistor being connected to said junction, and means for changing the value of one of said additional resistor and said additional capacitor to vary the R-C time constant of said integrating network.

References Cited in the file of this patent

UNITED STATES PATENTS

| | | |
|---|---|---|
| 2,552,884 | Cannon | May 15, 1951 |
| 2,583,003 | Mayle | Jan. 22, 1952 |
| 2,597,322 | Higinbotham | May 20, 1952 |